US008619320B2

(12) United States Patent
Watanabe

(10) Patent No.: US 8,619,320 B2

(45) Date of Patent: Dec. 31, 2013

(54) MOVEMENT DETECTION APPARATUS AND RECORDING APPARATUS

(75) Inventor: Taichi Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 12/911,596

(22) Filed: Oct. 25, 2010

(65) Prior Publication Data

US 2011/0102815 A1 May 5, 2011

(30) Foreign Application Priority Data

Oct. 30, 2009 (JP) ................................. 2009-250829

(51) Int. Cl.
*G06K 15/10* (2006.01)

(52) U.S. Cl.
USPC ............. 358/1.5; 358/1.4; 358/1.9; 358/1.12; 399/301; 399/302

(58) Field of Classification Search
None
See application file for complete search history.

(56) References Cited

U.S. PATENT DOCUMENTS 5,995,717 A * 11/1999 Tanaka .......................... 358/1.9
6,323,955 B1 * 11/2001 Kanai et al. .................. 358/1.17
6,934,498 B2 * 8/2005 Kobayashi et al. ........... 399/301
7,796,928 B2 * 9/2010 Kinoshita et al. ............. 399/301
8,194,266 B2 * 6/2012 Miyadera et al. ............ 358/1.14
2006/0050099 A1 * 3/2006 Murakami et al. .............. 347/19
2006/0093410 A1 * 5/2006 Hata ............................ 399/302
2008/0174791 A1 * 7/2008 Kudo ............................ 358/1.5
2010/0195129 A1 * 8/2010 Iio et al. ....................... 358/1.12

FOREIGN PATENT DOCUMENTS

JP 2007-217176 A 8/2007
JP 2007217176 A * 8/2007

* cited by examiner

*Primary Examiner* — Dung Tran

(74) *Attorney, Agent, or Firm* — Canon U.S.A., Inc. IP Division

(57) ABSTRACT

The movement detection apparatus acquires a movement state of an object by clipping a template pattern from first image data and seeking a region having a high correlation with the template pattern in second image data. The movement detection apparatus performs at least one of first processing, which analyzes the first image data, and second processing, which analyzes a relationship between the first image data and third image data acquired after the first image data has been acquired and before the second image data is acquired, and sets a position at which the template patter is clipped.

11 Claims, 14 Drawing Sheets

CORRELATION VALUE TABLE

MOVEMENT DETECTION APPARATUS AND RECORDING APPARATUS

BACKGROUND OF THE INVENTION

1. Field of the Invention

The present invention relates to a technique for detecting a movement of an object by using image processing, and a technical field of a recording apparatus.

2. Description of the Related Art

When printing is performed while a medium such as a print sheet is being conveyed, if conveyance accuracy is low, density unevenness of a halftone image or a magnification error may be generated, thereby deteriorating quality of acquired print images.

Therefore, although high-performance components are adopted and an accurate conveyance mechanism is mounted, requests about print qualities are demanding, and further enhancement of accuracy is requested. In addition, requests about costs are also demanding. Both of high accuracy and low costs are requested.

To address these issues, and thus, to detect a movement of a medium with high accuracy and perform stable conveyance by a feedback control, it has been attempted to capture the image of a surface of the medium and detect the movement of the medium that is being conveyed by image processing.

Japanese Patent Application Laid-Open No. 2007-217176 discusses a method for detecting the movement of the medium. According to Japanese Patent Application Laid-Open No. 2007-217176, an image sensor captures images of a surface of a moving medium several times in time series, the acquired images are compared with each other by performing pattern matching processing, and thus an amount of the movement of the medium can be detected. Hereinafter, a method in which a movement state is detected by directly detecting the surface of the object is referred to as "direct sensing", and a detector using this method is referred to as a "direct sensor".

When the direct sensing is used to detect the movement, the surface of the medium needs to be optically, sufficiently identified and unique patterns need to be obvious. However an applicant of the present exemplary embodiment has found that, under conditions described below, accuracy of pattern matching can be deteriorated.

When a template pattern in a first image (reference image) to be clipped is located at a fixed position, following problems may arise.

(1) FIGS. 12A, 12B, 12C, and 12D, illustrate an example where a movement of a conveyance belt on which a number of markers randomly carved is detected. As illustrated in FIG. 12A, when the template pattern of the first image includes a number of characteristic markers, the same images can be easily identified by using pattern matching in a second image.

However, as illustrated in FIG. 12B, when the template pattern includes only one marker and most part thereof is unpatterned, a part including another marker can be erroneously detected in the second image.

This phenomenon can often occur when a carving density of the markers is low and the markers are sparsely carved, or when the image has a flaw larger than the marker. Further, when the image of the surface of the medium, not the conveyance belt, is captured, a similar phenomenon can often occur.

(2) When the image of the surface of the medium having a rough and uneven surface is captured, uneven illuminance may be generated in apart of an illuminated region due to the rough, uneven surface, or illumination light may cause specular reflection due to the rough, uneven surface, and thereby contrast of the captured image may be decreased. Thus, the surface of the medium may not be appropriately used as the template pattern.

Further, due to changes across the ages of a light source or the image sensor, uneven illuminance is generated in the illumination region or photoelectric conversion is not normally performed in a part of a region of the sensor. In these cases, the accuracy of the pattern matching may be also deteriorated.

(3) As illustrated in FIG. 12C, if the template pattern includes dust placed on the image sensor, even when an object moves, an image of the dust does not move on the image of the object. Thus, the dust can cause deterioration of the accuracy of the pattern matching.

(4) When the image is formed on the image sensor using a lens, as illustrated in FIG. 12D, due to influence of distortion of the image caused by optical characteristics of the lens, the marker in the template pattern can be distorted. The image is particularly distorted when a refractive index distribution lens is used, thereby causing the deterioration of the accuracy of the pattern matching.

SUMMARY OF THE INVENTION

According to an aspect of the present invention, an apparatus includes a sensor configured to capture an image of a surface of a moving object to acquire first and second data, and a processing unit configured to acquire a movement state of the object by clipping a template pattern from the first data and seeking a region having a correlation with the template pattern in the second data. The processing unit analyzes the first data and then performs processing for setting a position at which the template pattern is clipped.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Configuration components described in the exemplary embodiments are merely one of the examples and not intended to limit a scope of the present invention.

A range, to which the present invention is applied, widely covers a field of movement detection, including printers, where detection of the movement of an object with high accuracy is requested. For example, the present invention can be applied to devices such as printers and scanners, and also devices used in a manufacturing field, an industrial field, and a distribution field where various types of processing such as examination, reading, processing, and marking are performed while the object is being conveyed.

Further, the present invention can be applied to various types of printers of an ink-jet method, of an electro-photographic method, of a thermal method, or of a dot impact method.

In this specification, a "medium" refers to a medium having a sheet shape or a plate shape made of paper, plastic sheet, film, glass, ceramic, or resin. In addition, an upstream and a downstream described in this specification are described based on a conveyance direction of a sheet while image recording is being performed on the sheet.

An exemplary embodiment of the printer of the ink-jet method, which is an example of the recording apparatuses, will be described. The printer of the present exemplary embodiment is a serial printer, in which a reciprocal movement (main scanning) of a printer head and step feeding of a medium by a predetermined amount are alternately performed to form a two-dimensional image.

The present invention can be applied not only to the serial printer but also to a line printer including a long line print head for covering a print width, in which the medium moves with respect to the fixed print head to form the two-dimensional image.

Figure 1:
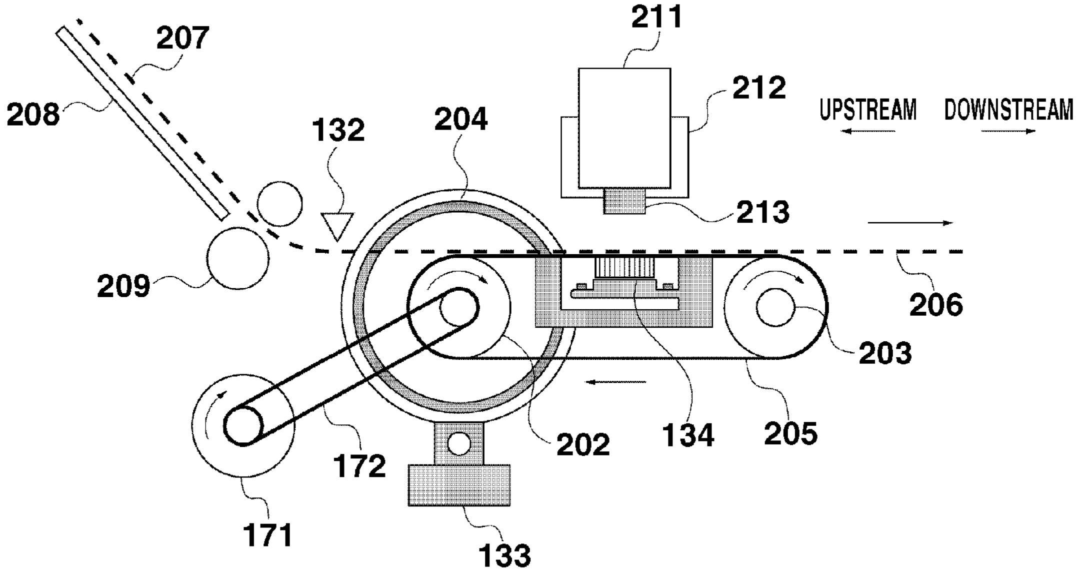
FIG. 1 is a vertical cross sectional view of a printer according to an exemplary embodiment of the present invention.

FIG. 1 is a vertical cross sectional view illustrating a configuration of a main part of the printer. The printer includes a conveyance mechanism that causes a belt conveyance system to moves the medium in a sub scanning direction (first direction or predetermined direction) and a recording unit that performs recording on the moving medium using the print head. The printer further includes an encoder 133 that indirectly detects a movement state of the object and a direct sensor 134 that directly detects the movement state thereof.

The conveyance mechanism includes a first roller 202 and a second roller 203, which are rotating members, and a wide conveyance belt 205 stretched around the rollers 202 and 203 with a predetermined tension. A medium 206 is attracted to a surface of the conveyance belt 205 with an electrostatic force or adhesion, and conveyed along with the movement of the conveyance belt 205.

A rotating force generated by a conveyance motor 171, which is a driving force of sub scanning, is transmitted to the first roller 202, which is a driving roller, via a driving belt 172 to rotate the first roller 202. The first roller 202 and the second roller 203 rotate in synchronization with each other via the conveyance belt 205.

The conveyance mechanism further includes a feeding roller 209 for separating each one of the media 207 stored on a tray 208 and feeding the medium 207 onto a conveyance belt 205, and a feeding motor 161 (not illustrated in FIG. 1) for driving the feeding roller 209. A paper end sensor 132 provided at a downstream of the feeding motor 161 detects a front end or a rear end of the medium to acquire timing for conveying the medium.

The encoder 133 (rotation angle sensor) of a rotary type detects a rotation state of the first roller 202 and indirectly acquires a movement state of the conveyance belt 205. The encoder 133 includes a photo interrupter and optically reads slits carved at equal intervals along a periphery of a code wheel 204 provided about a same axis as that of the first roller 202, to generate pulse signals.

A direct sensor 134 is disposed beneath the conveyance belt 205 (at a rear side opposite to a side on which the medium 206 is placed). The direct sensor 134 includes an image sensor (imaging device) that captures an image of a region including a marker marked on the surface of the conveyance belt 205. The direct sensor 134 directly detects the movement state of the conveyance belt 205 by image processing described below.

Since the surface of the conveyance belt 205 and that of the medium 206 are firmly adhered to each other, a relative position change caused by slipping between the surfaces of the belt and the medium is small enough to be ignored. Therefore, the direct sensor 134 can be regarded as performing the detection, which is equivalent to directly detecting the movement state of the medium 206.

The direct sensor 134 is not limited to the configuration in which the rear surface of the conveyance belt 205 is captured, but the direct sensor 134 may capture the image of a front surface of the conveyance belt 205 that is not covered with the medium 206. Further, the direct sensor 134 may capture the image of the surface of the medium 206 not the surface of the conveyance belt 205, as the object.

A recording unit includes a carriage 212 that reciprocately moves in a main scanning direction, and a print head 213 and an ink tank 211 that are mounted in the carriage 212. The carriage 212 reciprocately moves in the main scanning direction (second direction) by a driving force of a main scanning motor 151 (not illustrated in FIG. 1).

Ink is discharged from nozzles of the print head 213 in synchronization with the movement described above to perform printing on the medium 206. The print head 213 and the ink tank 211 may be unified to be attachable to and detachable from the carriage 212, or may be individually attachable to and detachable from the carriage 212 as separate components.

The print head 213 discharges the ink by using the ink-jet method. The method can adopt heater elements, piezoelectric elements, static elements, and micro electro mechanical system (MEMS) devices.

Figure 2:
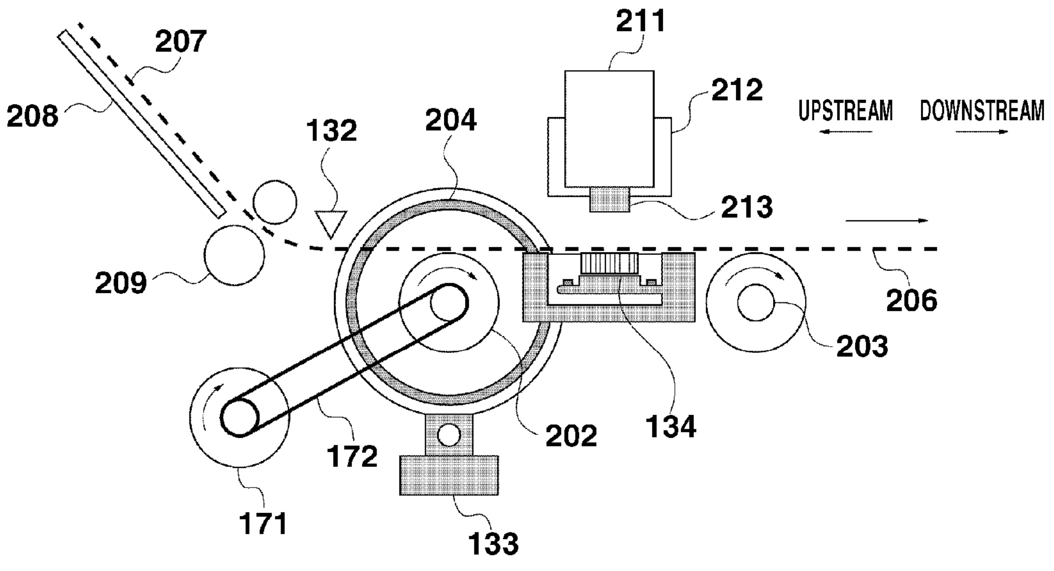
FIG. 2 is a vertical cross sectional view of a modified printer.

The conveyance mechanism is not limited to the belt conveyance system, but, as a modification example, may adopt a mechanism for causing the conveyance roller to convey the medium without using the conveyance belt. FIG. 2 illustrates a vertical cross sectional view of a printer of a modification example. Same numerals are given to the same members as those in FIG. 1.

Each of the first roller 202 and the second roller 203 directly contacts with the medium 206 and moves the medium 206. A synchronization belt (not illustrated) is stretched around the first roller 202 and the second roller 203, so that the second roller 203 rotates in synchronization with a rotation of the first roller 202. According to the present exemplary embodiment, the object whose image is captured by the direct sensor 134 is not the conveyance belt 205 but the medium 206. The direct sensor 134 captures the image of the rear surface side of the medium 206.

Figure 3:
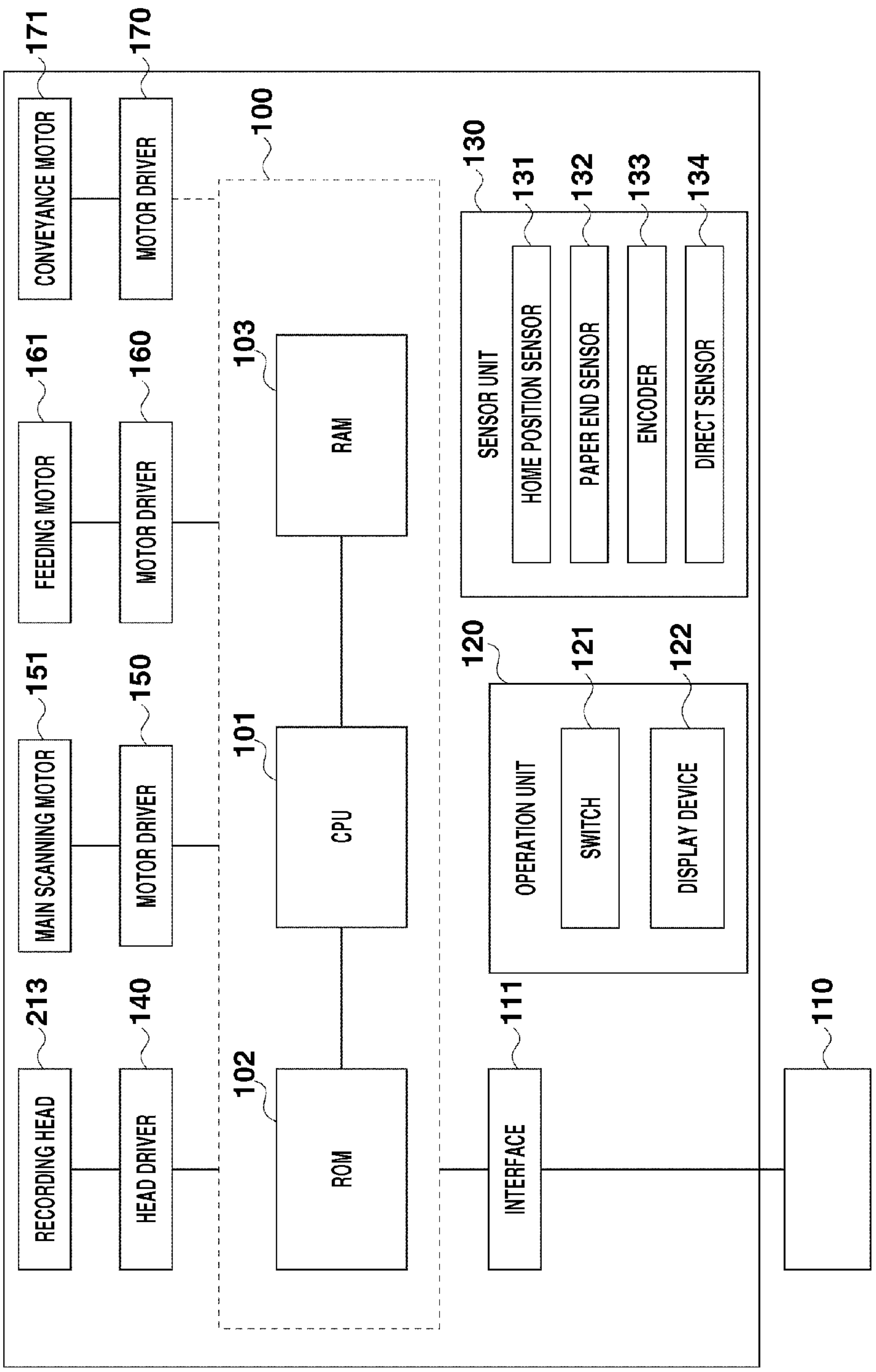
FIG. 3 is a block diagram of a system of the printer.

FIG. 3 is a system block diagram of the printer. The controller 100 includes a central processing unit (CPU) 101, a read only memory (ROM) 102, and a random access memory (RAM) 103. The controller 100 works as both of a control unit and a processing unit that deal with various types of controls and image processing in an entire printer.

An information processing apparatus 110 may be a computer, digital camera, television set (TV), and mobile phone, and supplies image data to be recorded on the medium. The information processing apparatus 110 is connected to the controller 100 via an interface 111. An operation unit 120 serves as a user interface between the apparatus and an operator, and includes various types of input switches 121 including a power source switch, and a display device 122.

A sensor unit 130 is a group of sensors that detect various types of states of the printer. A home position sensor 131 detects a home position of the carriage 212 that reciprocately moves. The sensor unit 130 includes a paper end sensor 132 described above, the encoder 133, and the direct sensor 134. Each of these sensors is connected to the controller 100.

Based on instructions of the controller 100, the printer head or various types of motors of the printer are driven via drivers. A head driver 140 drives the print head 213 according to recording data. A motor driver 150 drives a main scanning motor 151. A motor driver 160 drives a feeding motor 161. A motor driver 170 drives a conveyance motor 171 for sub scanning.

Figure 4:
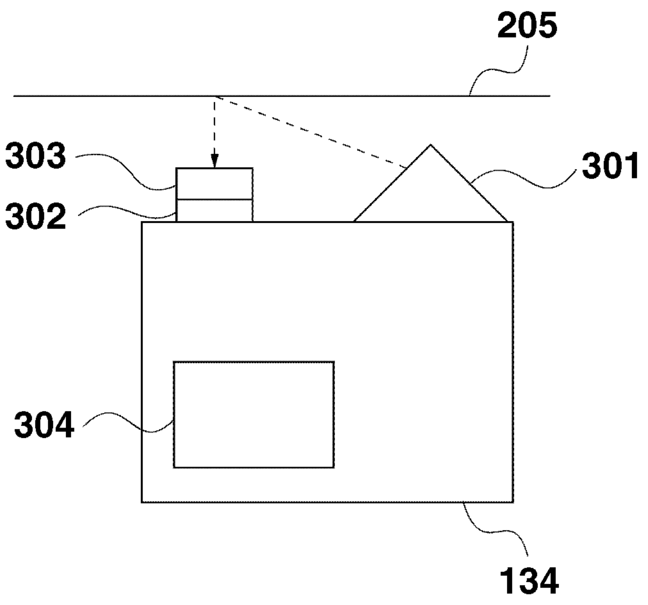
FIG. 4 illustrates a configuration of a direct sensor.

FIG. 4 illustrates a configuration of a direct sensor 134 for performing direct sensing. The direct sensor 134 serves as a sensor unit that includes a light emitting unit including a light source 301 of light emitting diode (LED), organic light emitting diode (OLED), and semi conductor laser, a light receiving unit including an image sensor 302 and a refractive index distribution array 303, and a circuit unit 304 including a drive circuit and an analog/digital (A/D) convertor circuit.

The light source 301 irradiates a part of the rear surface side of the conveyance belt 205, which is an imaging target. The image sensor 302 captures an image of a predetermined imaging region irradiated via the refractive index distribution array 303. The image sensor 302 is a two-dimensional area sensor or a line sensor such as a charge coupled device (CCD) image sensor or a complementary metal-oxide semiconductor (CMOS) image sensor.

Signals output from the image sensor 302 are A/D converted and taken in as digital image data. The image sensor 302 captures the image of the surface of the object (conveyance belt 205) and acquire a plurality of image data (pieces of sequentially acquired data are referred to as "first image data" and "second image data") at different timings.

As described below, the movement state of the object can be acquired by clipping the template pattern from the first image data and, in the second image data, seeking a region that has a high correlation with the acquired template pattern by the image processing. The controller 100 may serve as the processing unit for performing the image processing, or the processing unit may be built in a unit of the direct sensor 134.

Figure 5:
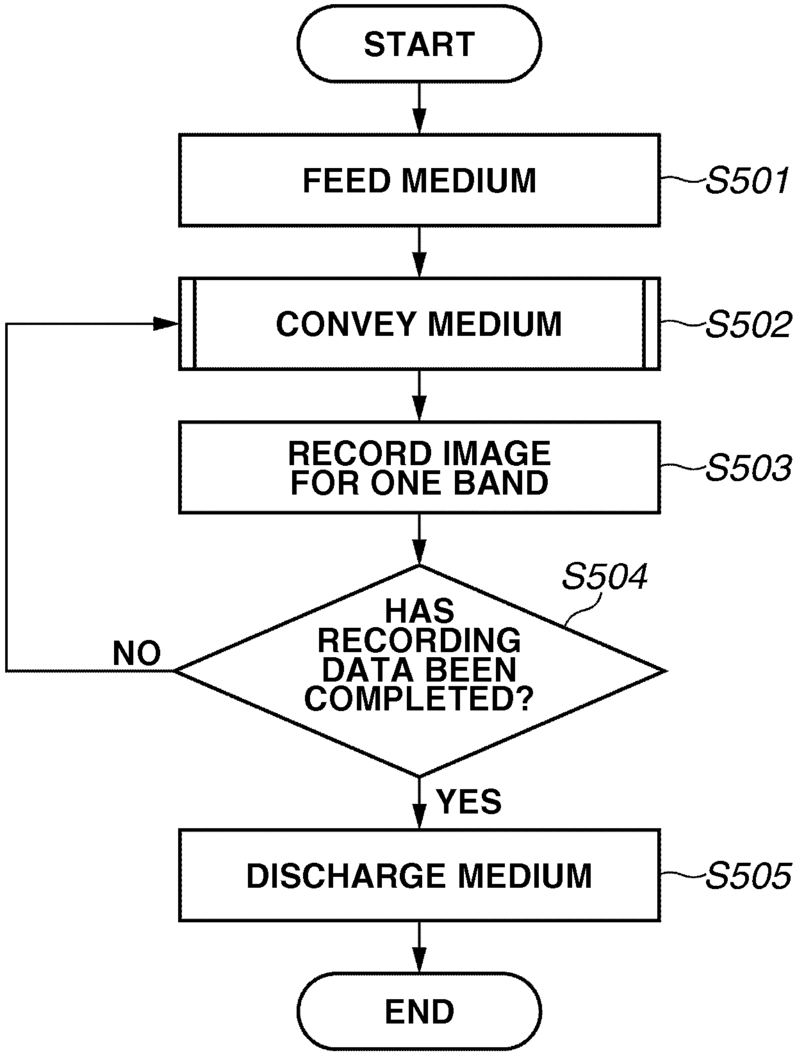
FIG. 5 is a flowchart illustrating an operation sequence of feeding, recording and discharging a medium.

FIG. 5 is a flowchart illustrating a series of operation sequences for feeding, recording, and discharging. These operation sequences are performed based on the instructions given by the controller 100.

In step S501, the feeding motor 161 is driven to cause the feeding roller 209 to separate off each one of the media 207 stored on the tray 208 and to feed the medium 207 along a conveyance path. When the paper end sensor 132 detects a leading end of the medium 206 that is being fed, based on the detection timing, a cuing operation is performed on the medium 206, and then the medium 206 is conveyed to a predetermined recording starting position.

In step S502, the medium 206 is step-fed by a predetermined amount using the conveyance belt 205. The predetermined amount refers to a length of recording performed in one band (one main scanning performed by the printer head) in the sub scanning direction. For example, when a multi path recording is performed by feeding the medium 206 by a half of a width of a nozzle array in the sub scanning direction of the print head 213 and superimposing the images recorded each two times, the predetermined amount is a length of a half width of the nozzle array in the sub scanning direction.

In step S503, the image for one band is recorded while the carriage 212 is moving the print head 213 in the main scanning direction. In step S504, it is determined whether recording has been performed on all recording data. When there is the recording data that has not been recorded yet (NO in step S504), the processing returns to step S502 and performs the step-feeding in the sub scanning direction and the recording for one band in the main scanning direction again.

When the recording has been completed (YES in step S504) on all recording data, the processing proceeds to step S505. In step S505, the medium 206 is discharged from the recording unit. As described above, a two-dimensional image is formed on one medium 206.

Figure 6:
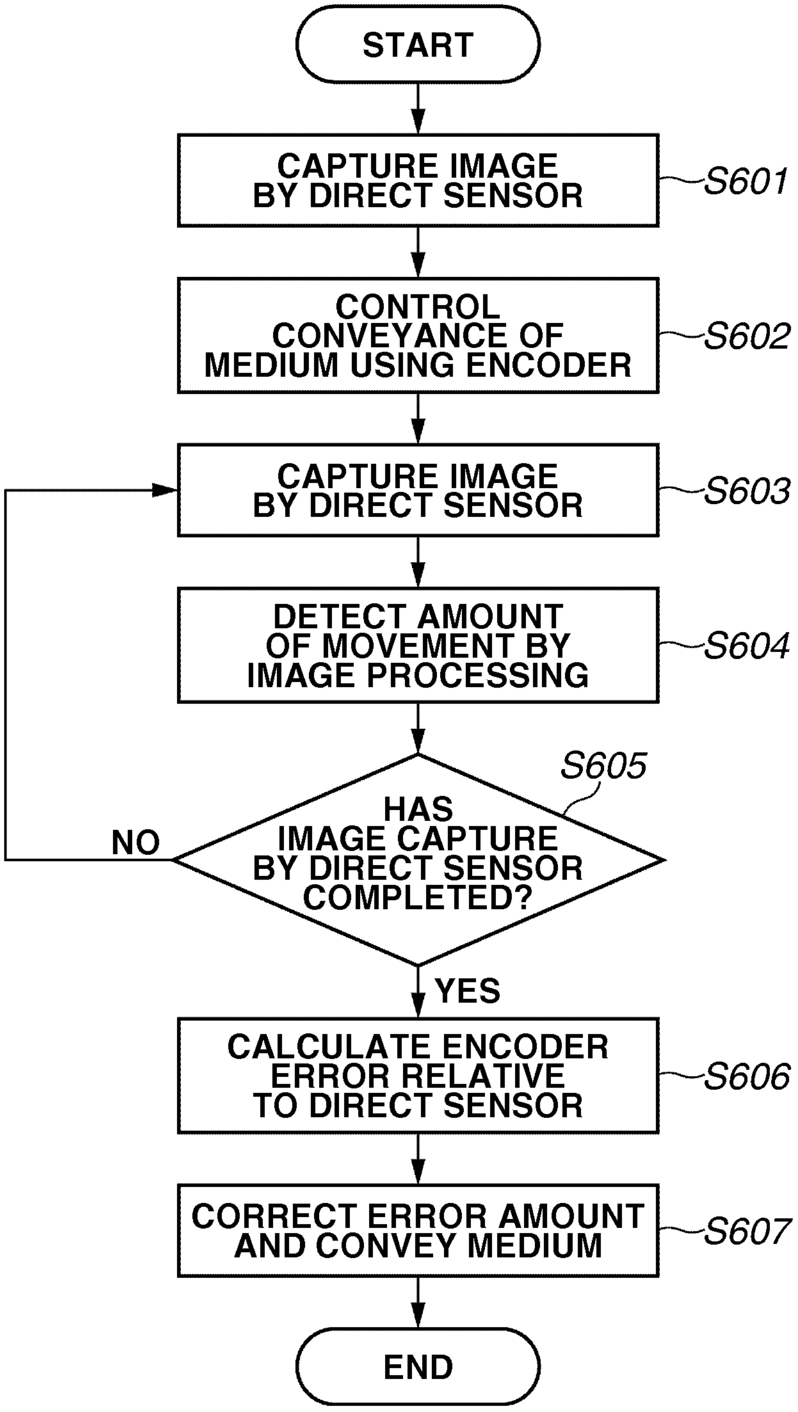
FIG. 6 is a flowchart illustrating an operation sequence of conveying the medium.

With reference to a flowchart illustrated in FIG. 6, an operation sequence of step-feeding performed in step S502 will be described in detail. In step S601, the image sensor of the direct sensor 134 captures an image of the region of the conveyance belt 205 including the marker. The acquired image data indicates a position of the conveyance belt before the movement has been started, and is stored in the RAM 103.

In step S602, while the encoder 133 is monitoring the rotation state of the first roller 202, the conveyance motor 171 is driven to move the conveyance belt 205, in other words, conveyance control of the medium 206 is started. The controller 100 performs servo-control to convey the medium 206 by a target amount of conveyance. Under the conveyance control using the encoder, the processing subsequent to step S603 is executed.

In step S603, the direct sensor 134 captures the image of the belt. The image is captured when it is estimated that a predetermined amount of medium has been conveyed. The predetermined amount of medium is determined by the amount of the medium to be conveyed for one band (hereinafter, referred to as "target amount of conveyance"), a width of the image sensor in the first direction, and a conveyance speed.

According to the present exemplary embodiment, a specific slit on the code wheel 204 to be detected by the encoder 133, when the medium has been conveyed by the predetermined amount, is specified. When the encoder 133 detects the slit, capturing the imaging is started. Further detail in step S603 will be described below.

In step S604, by the image processing, what distance the conveyance belt 205 is moved between the second image data captured in step S603, which is immediately before step S604, and the first image data, which is captured previous to the second image data by one, is detected. Details of processing for detecting the amount of movement will be described below. The images are captured at a predetermined interval the predetermined number of times according to the target amount of conveyance.

In step S605, it is determined whether the predetermined numbers of times of images have been captured. When the predetermined number of times of images is not captured (NO in step S605), the processing returns to step S603 to repeat the processing until the predetermined number of times of the images are captured. The amount of conveyance is accumulated every time the amount of conveyance is repeatedly detected by the predetermined number of times. The amount of conveyance for one band is then acquired from the timing when the image is first captured in step S601.

When capturing images predetermined times is completed, the processing proceeds to step S606. In step S606, an amount of difference for one band between the amount of conveyance acquired by the direct sensor 134 and that by the encoder 133 is calculated. The encoder 133 indirectly detects the amount of conveyance, and thus accuracy of indirect detection of the amount of conveyance performed by the encoder 133 is lower than that of direct detection thereof performed by the direct sensor 134. Therefore, the amount of difference described above can be regarded as a detection error of the encoder 133.

In step S607, correction is given to the conveyance control by the amount of the encoder error acquired in step S606. The correction includes a method for correcting information about a current position under the conveyance control by increasing/decreasing by the amount of error, and a method for correcting the target amount of conveyance by the error amount. Any one of the methods may be adopted.

As described above, the medium 206 is correctly conveyed until the target amount of the medium 206 is achieved by the feedback control, and then the conveyance of the amount for one band is completed.

Figure 7A:
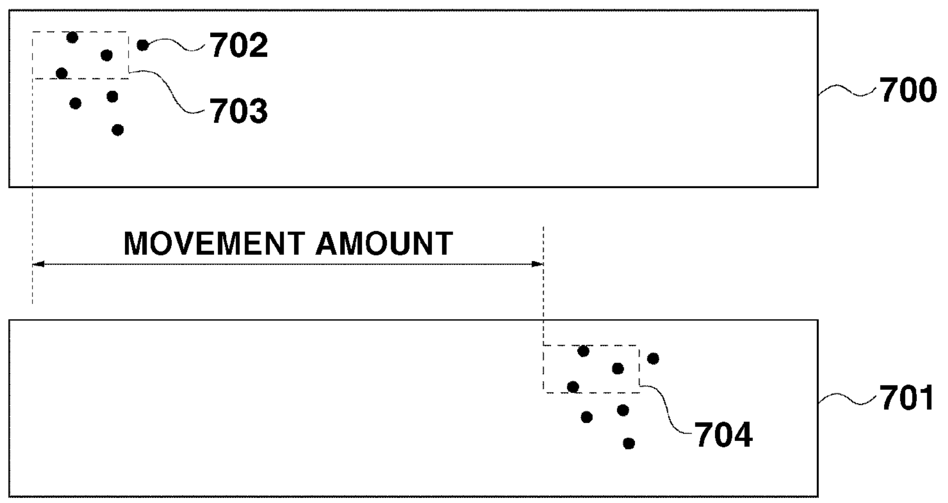
FIGS. 7A and 7B illustrate processing for acquiring an amount of movement by using pattern matching.
Figure 7B:
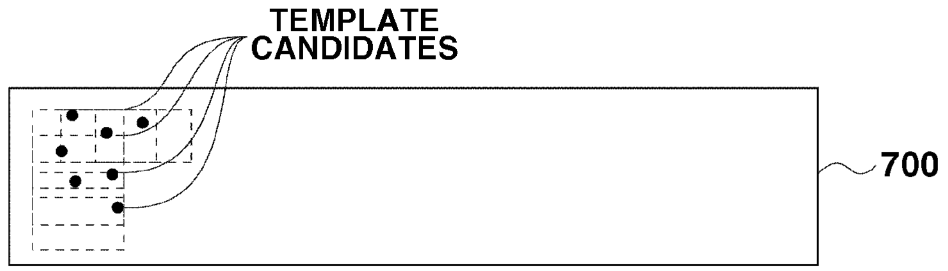

FIGS. 7A and 7B illustrate details of processing in step S604 described above. FIG. 7A schematically illustrates first image data 700 of the conveyance belt 205 and second image data 701 thereof acquired by capturing the images by the direct sensor 134.

A number of patterns 702 (part having gradation difference between brightness and darkness) indicated with black points in the first image data 700 and the second image data 701 are formed of a number of images of markers applied on the conveyance belt 205 randomly or based on a predetermined rule.

As an apparatus illustrated in FIG. 2, when the object is the medium, microscopic patterns (e.g., pattern of paper fibers) on the surface of the medium are similarly used to patterns given on the conveyance belt 205. For the first image data 700, a template pattern 703 is set in a predetermined template region located on an upstream side, and the image of this part is clipped.

When the second image data 701 is acquired, where a pattern similar to the template pattern 703, which is clipped, is located in the second image data 701 is searched. The search is performed by using the pattern matching method. As an algorithm for determining similarity, Sum of Squared Difference (SSD), Sum of Absolute Difference (SAD), Normalized Cross-Correlation (NCC) are known, and any of those may be adopted.

In this example, the most similar pattern is located in a region 704. An amount of difference between the number of pixels on the imaging device of the template pattern 703 in the first image data 700 and that of the region 704 in the second image data 701 in the sub scanning direction is acquired. By multiplying the amount of the difference between the numbers of pixels described above by a distance corresponding to one pixel, the amount of the movement (amount of conveyance) can be acquired.

According to the present exemplary embodiment, as illustrated in FIG. 7B, template candidates that are located at a plurality of positions and used to clip a template pattern are set in the first image data 700, and then an appropriate pattern is selected from among the candidates.

The template candidate is a partial image in the first image data, and is individual image that has become the candidate of the template pattern. More specifically, a plurality of template candidates, when being started to be selected, are narrowed down by selection processing. When one template candidate is finally selected, the template candidate becomes the template pattern and is used to detect the amount of the movement using the template matching.

Further, a term "template candidate" used at a stage where narrowing down has been performed once or more indicates only the image that has not been eliminated and still remains.

<Flow of Template Pattern Selection>

To acquire the best template position, a maximum number of template candidates are set in the first image data, correlation is examined on all points in the second image data, and the template candidate having a maximum correlation value among all template candidates can be set as the template pattern.

However, for recording apparatuses that need both of high performance (high-speed conveyance and high throughput) and low cost, such hardware resources for instantly performing enormous amount of calculation are not realistic. How the preferable template pattern is set with less amount of calculation is to be addressed.

According to the present exemplary embodiment, to determine the positions of the template patterns, instead of using the second image data, processing of the pattern matching is immediately started after the second image data has been acquired to realize the high-speed conveyance and high throughput. After the first image data has been acquired, setting the template pattern is completed before the second image data is to be acquired.

FIGS. 9A, 9B, 9C, and 9D are flowcharts illustrating four examples of procedures for selecting the template pattern. Based on two types of selection methods for narrowing down using an image evaluation value and a table evaluation value, cases are classified according to combinations of the selection methods.

Examples commonly set the template candidate first. The apparatus of the present exemplary embodiment can execute any one of the four methods.

Figure 9A:
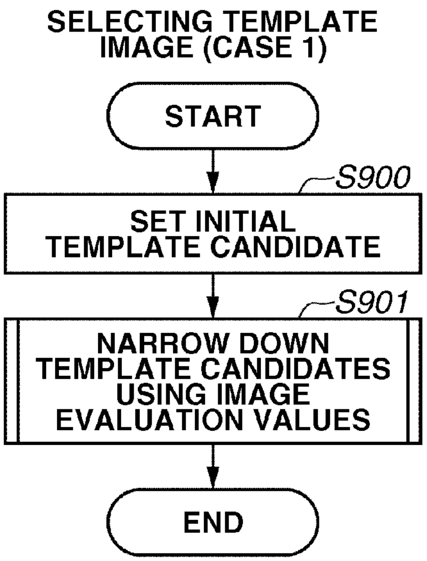
FIGS. 9A, 9B, 9C and 9D are flowcharts illustrating four examples of procedures for selecting a template pattern.

According to a method of Case 1 illustrated in FIG. 9A, selection is completed only by performing the narrowing-down processing using the image evaluation value. Details of the narrowing-down processing using the image evaluation value will be described below.

In step S900, a plurality of initial template candidates are set. How to set up will be described below. In step S901, the narrowing-down processing is performed once on a plurality of candidates using the image evaluation value to determine an appropriate template.

This method is useful when the high-speed conveyance in a very short time is requested for the processing or when the hardware resources of control (operation capacity of CPU or capacity of RAM) are small.

Figure 9B:
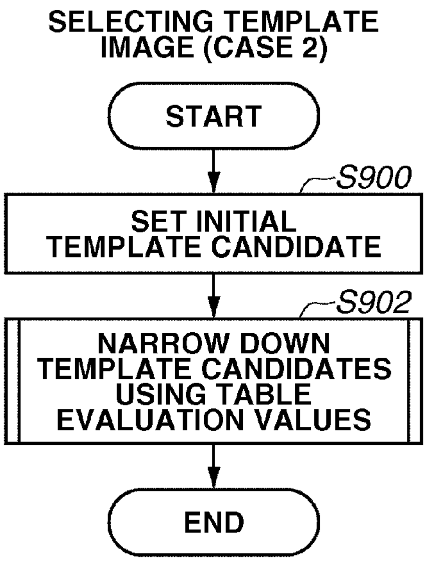

A method of Case 2 illustrated in FIG. 9B completes selection only by performing the narrowing-down processing using the table evaluation value. Details of the narrowing-down processing using the table evaluation value will be described below.

Similar to the method described above, a plurality of initial template candidates are set in step S900. In step S902, the narrowing-down processing is performed once using the table evaluation value to determine an appropriate template. According to this method, after the first image data has been captured, another image is captured before the second image data is to be captured, to acquire the third image data.

Therefore, although the case of FIG. 9B is inferior to the case of FIG. 9A in speed, the case of FIG. 9B can more accurately set the template pattern by performing evaluation including various types of uncertainty factors and unknown error factors that can hardly be determined by the image evaluation value.

For example, the influence by the adhered dust or the image distortion caused by the refractive index distribution lens, is preferably determined by using the table evaluation value by actually examining the correlation thereof.

Figure 9C:
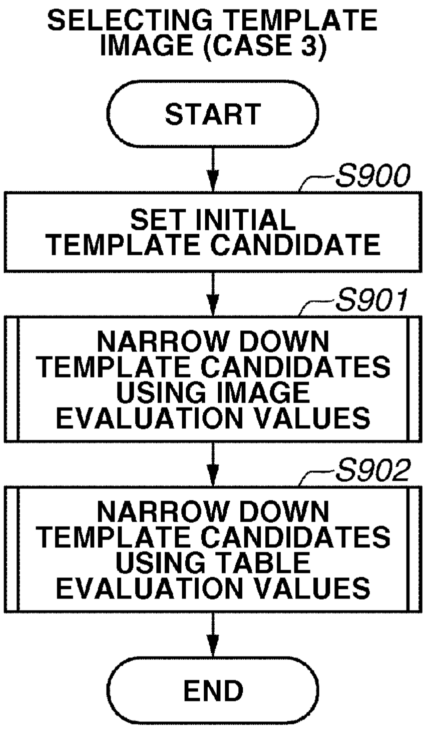

According to a method of Case 3 illustrated in FIG. 9C, after the narrowing-down processing has been performed using the image evaluation, the narrowing-down processing is performed using the table evaluation value, and then the selection is completed.

In step S900, similar to the method described above, a plurality of initial template candidates are set. In step S901, the narrowing down processing is performed once using the image evaluation value. Subsequently, in step S902, the narrowing down processing is performed using the table evaluation value, to determine an appropriate template.

Characteristics of two types of the selection methods described above are combined in a complementary manner to acquire the method. It can be useful to narrow down the template candidates using the table evaluation value after an inappropriate template candidate has been previously eliminated using the image evaluation value. The processing of this case can be completed in a shorter time than that in the Case 2.

Examples includes a case where, when an image having a white region in which irradiated light is regularly reflected is captured and when a part of the white region is defined as the template pattern, the image has the high correlation with a region in which the white markers are concentrated. In another case in which an image of a surface of a sheet is directly captured and there are fewer characteristic points on the image, many template candidates can be previously eliminated by the image evaluation value.

Figure 9D:
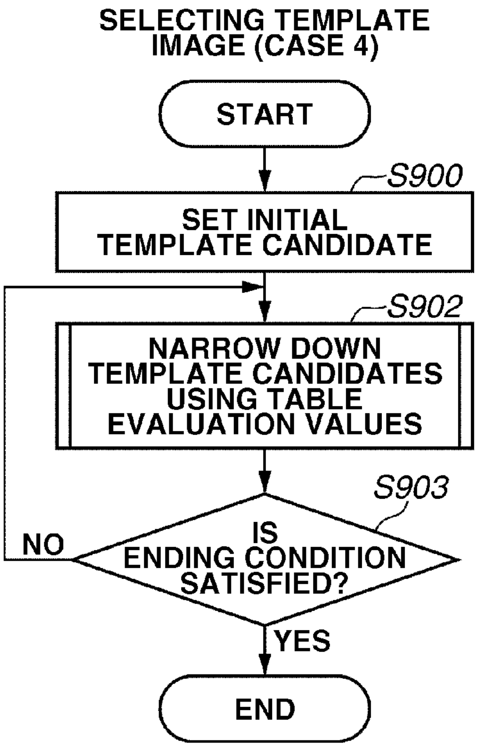

According to the method of Case 4 illustrated in FIG. 9D, the narrowing-down processing is performed using the table evaluation value repeatedly while the image of the third image data is captured a plurality of times.

In step S900, similar to the method described above, a plurality of initial template candidates are set. In step S902, the narrowing-down processing is performed using the table evaluation value, and then performed repeatedly until an ending condition is satisfied, to determine an appropriate template.

The ending condition in step S903 may be defined in such a manner that the processing is ended when it is performed a predetermined number of times, or, the processing may be performed repeatedly so that the candidates having a predetermined threshold value or more are left each time, and then, when the predetermined number or less of the candidates are left, the processing may be ended.

Since this method takes much time, this method is not suitable for the high-speed processing. However, this method is not influenced by a coincidence and can select the most stable template pattern.

Generally, the amount and time of the operation and the accuracy of selecting the template pattern have a tradeoff relationship. Comparing the above-described Case 1, Case 2, Case 3, and Case 4 to each other, the former cases have the smaller operation amount and operation time, and the latter cases have the higher accuracy of the selection of the template pattern. Depending on the high-speed performance requested for the hardware resources of the controller or the recording apparatus, an appropriate selection method from among Case 1, Case 2, Case 3, and Case 4 may be used.

<Setting Initial Template Candidates>

A method for setting the initial template candidate in step S900 illustrated in FIG. 9 will be described. For example, as illustrated in FIG. 7B, at the upstream side in the first image data 700, patterns having a rectangular shape are set as a plurality (e.g., twenty) of candidates while being slightly shifted in the main scanning direction and the sub scanning direction.

The template candidates located at a plurality of positions are not limited to the template candidates having a same size or a same aspect ratio of the rectangular, but the template candidates having different sizes or aspect ratios may be set all together. Each template candidate holds the position thereof as the coordinates in the first image data and has a decreased memory capacity necessary for storing information.

To include the template located at the best position, a plurality of templates may be set while being shifted every one pixel. In this case, since the enormous amount of calculation for performing the pattern matching is necessary, actually the candidates are shifted every several to every several dozens of pixels to set maximum twenty candidates.

The number of the candidates is determined considering a balance between the number thereof and processing capacity of the controller. Further, if an inappropriate region as the template pattern is known in advance through calibration, the region is excluded to set the template candidates.

<Narrowing down Using Image Evaluation Value>

Figure 10:
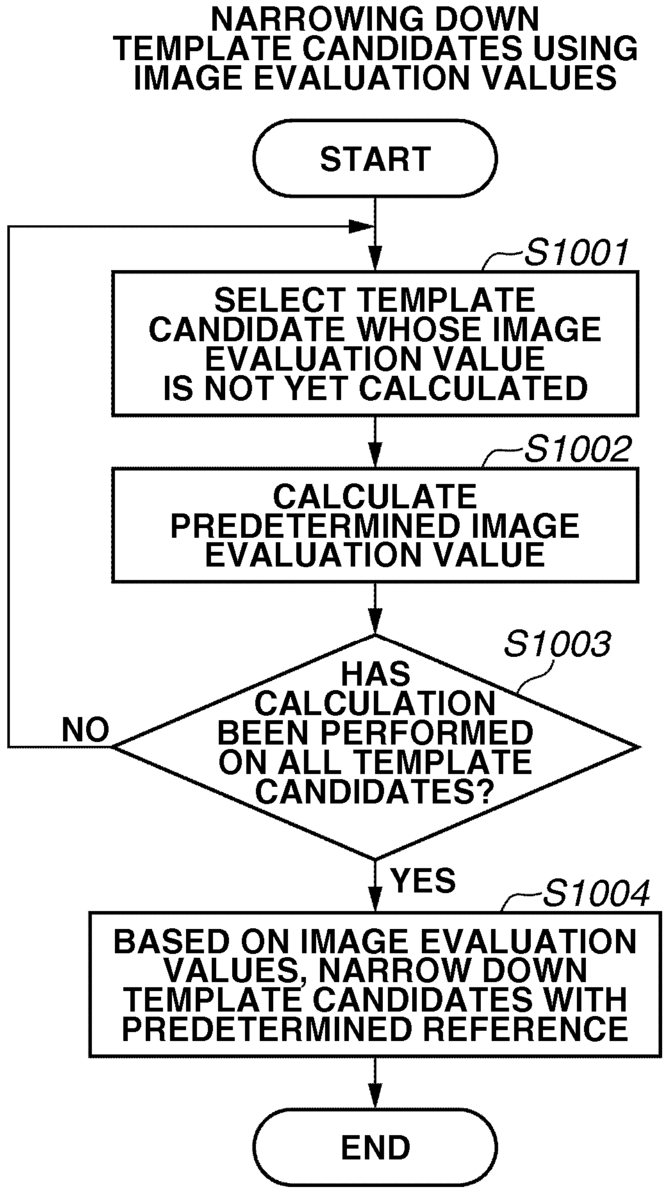
FIG. 10 is a flowchart illustrating a procedure for narrowing down template candidates using an image evaluation value.

The narrowing down using the image evaluation value performed in step S901 in FIG. 9 will be described with reference to a flowchart illustrated in FIG. 10. The narrowing down using the image evaluation value is processing (referred to as "first processing") that analyzes the first image data and then changeably sets the position at which the template pattern is clipped.

In step S1001, the CPU of the controller selects one template candidate whose image evaluation value has not been calculated yet from among the template candidates.

In step S1002, the image data of the selected template candidate is read from the RAM. When the position of each template candidate is stored as a coordinate in the first image data, the image data of the template candidate is acquired by being clipped from the first image data according to the predetermined size and aspect ratio. Using this image data, a predetermined image evaluation value is calculated.

The image evaluation value is evaluated only from the image data of the template candidate. It is determined that the larger the value is, the higher qualification the template candidate has. The image of the template candidate is evaluated using "image contrast" thereof. The higher the contrast value is, the higher the candidate is ranked.

Alternatively, how many markers the image includes may be detected as the image evaluation value, or, a plurality of evaluation items may be integrally evaluated to acquire the image evaluation value. The acquired image evaluation value is temporarily stored in the RAM or a register.

In step S1003, to calculate the above-described image evaluation value for each image of a plurality of template candidates, the processing is repeatedly performed until the image evaluation values are calculated for all template candidates.

In step S1004, based on the image evaluation value of each image acquired as described above, the template candidates are narrowed down based on a predetermined criterion. In the Case 1 illustrated in FIG. 9A, the template candidate having the largest image evaluation value is selected. In the Case 3 illustrated in FIG. 9C, the template candidates are narrowed down to the template candidates having the image evaluation values over a predetermined threshold value, or, the predetermined number of template candidates are selected sequentially from the template candidates having the largest image evaluation value. The selected template candidates are transferred to the next step S902.

<Narrowing Down Using Table Evaluation Value>

The narrowing down using the table evaluation value performed in step S902 illustrated FIG. 9 will be described with reference to a flowchart illustrated in FIG. 11A. The narrowing down using the table evaluation value is processing (referred to as "second processing") that analyzes relationships between the first image data and the third image data that is acquired after the first image data and before the second image data, and then changeably sets the position at which the template pattern is clipped.

In step S1101, the image data for selection (third image data) is acquired by image capturing. The third image data is used to examine the correlation between the template candidate and a part of the third image data.

The third image data is acquired by capturing the image of the same object as that of the first image data and the second image data using the same sensor as that thereof. Timing for acquiring the third image data is after the first image data and before the second image data.

In step S1102, the correlation is examined between the third image data acquired in step S1101 and respective template candidates located at a plurality of positions, to generate the correlation value table. The correlation value table is one-dimensional or two-dimensional aggregate of the correlation values acquired by examining the correlation between the template candidate and the third image data while the position of the template candidate is being shifted relative to the third image data.

Figure 8:
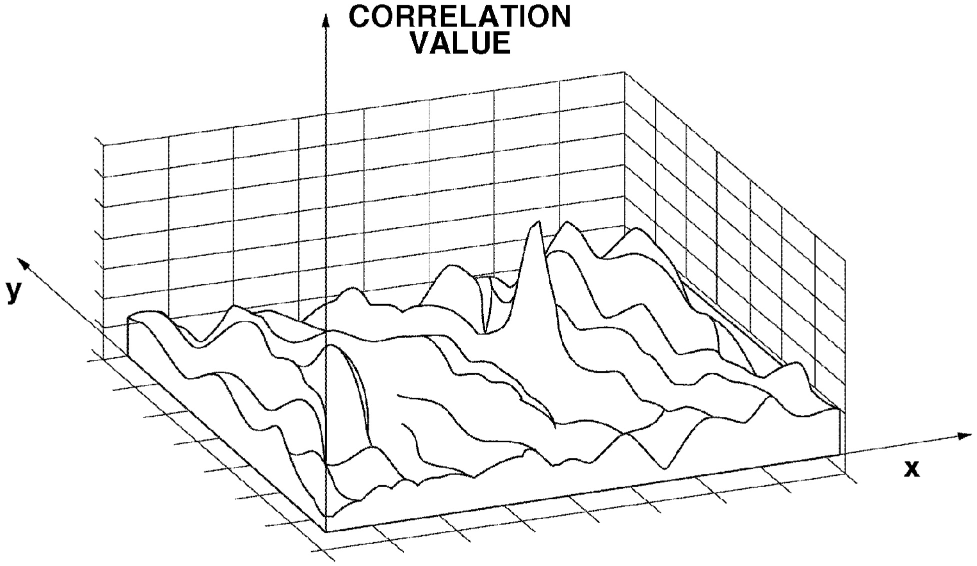
FIG. 8 is a three-dimensional graph in which a correlation value table is visualized.

The correlation is examined by a similar algorithm for examining the correlation between the second image data and the template pattern while the position of the template pattern is being shifted relative to the second image data when the amount of movement is actually detected. FIG. 8 visualizes the generated correlation table as a three-dimensional graph.

Coordinates (x, y) correspond to which position the template candidate is superposed onto in the third image data to examine the correlation. For example, if the correlation value acquired by superposing an upper left of the rectangular of the template candidate onto coordinates (20, 60) of the third image data is 0.5, the value of the correlation value table (20, 60) is defined as 0.5.

In step S1103, a table evaluation value is calculated for each correlation value table. Based on the table evaluation value calculated as described above, the template candidates are narrowed down.

The table evaluation value is defined only by the correlation value table and used as a reference for determining whether the template candidate, on which the correlation value table is based, is suitable as the template pattern.

More specifically, the table evaluation value is an evaluation index for evaluating whether the template candidate, on which the correlation value table is based, is suitable as the candidate or not. The table evaluation value is defined from experience of "when the correlation value table has such characteristics, generally, the amount of the movement can be detected with high accuracy".

For example, when "having the correlation" or "having no correlation" (or inverse correlation) is clearly recognized, the amount of the movement can be detected correctly. From the point of view described above, spread of all correlation values in the correlation value table is defined as the table evaluation value. The maximum value of the correlation value may be defined as the table evaluation value. Further, a multiplication of the spread and the maximum value of the correlation value may be defined as the table evaluation value.

Alternatively, based on a graph shape of the correlation value table, the table evaluation value may be given. For example, when there is a tendency in which the amount of the movement can be detected with high accuracy from the template in which a specific frequency is strongly output in an "x" direction having less movement of the object compared to a "y" direction having more movement thereof, the discrete Fourier transform is performed on a data column in the "x" direction. An acquired value may be defined as the table evaluation value.

In step S1104, the narrowing-down processing is repeatedly performed by looping until the narrowing down is completed on all items. For example, when the narrowing down, in which the spread has a predetermined threshold value or more and the maximum correlation value is a predetermined value or more, is performed on a plurality of items, the correlation value table is re-used to re-calculate the table evaluation value. When the narrowing down is performed with one table evaluation value, in step S1104, the processing ends without looping.

Figure 11A:
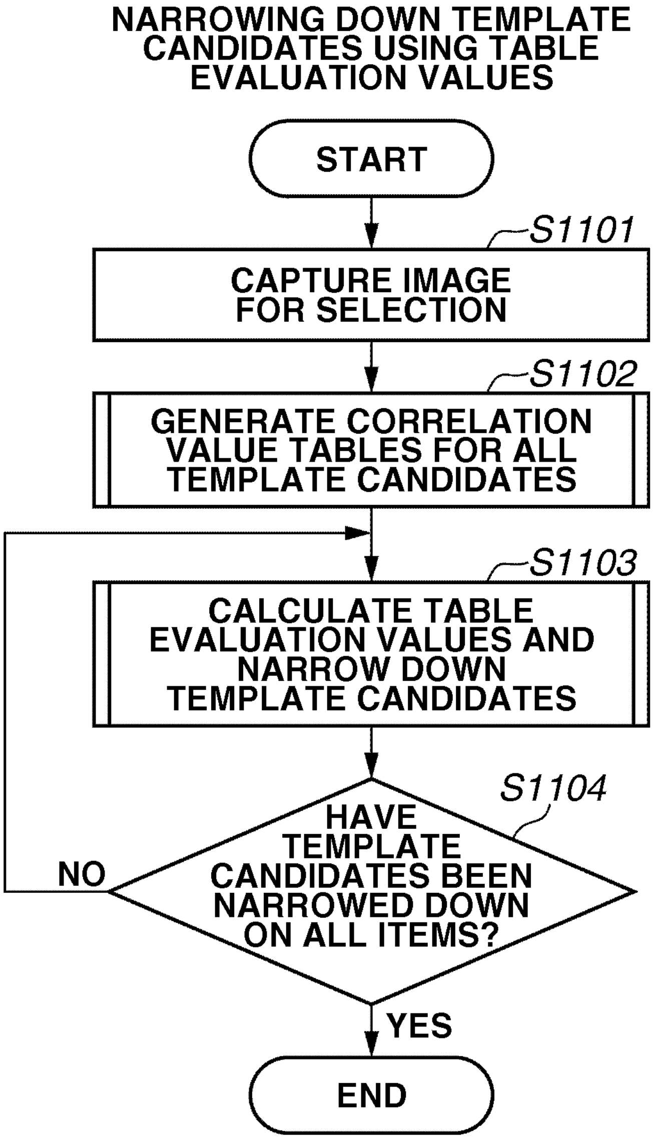
FIGS. 11A, 11B, and 11C are flowcharts illustrating procedures for narrowing down template candidates using table evaluation values.

Steps S1102 and S1103 illustrated in FIG. 11A will be further described.

Figure 11B:
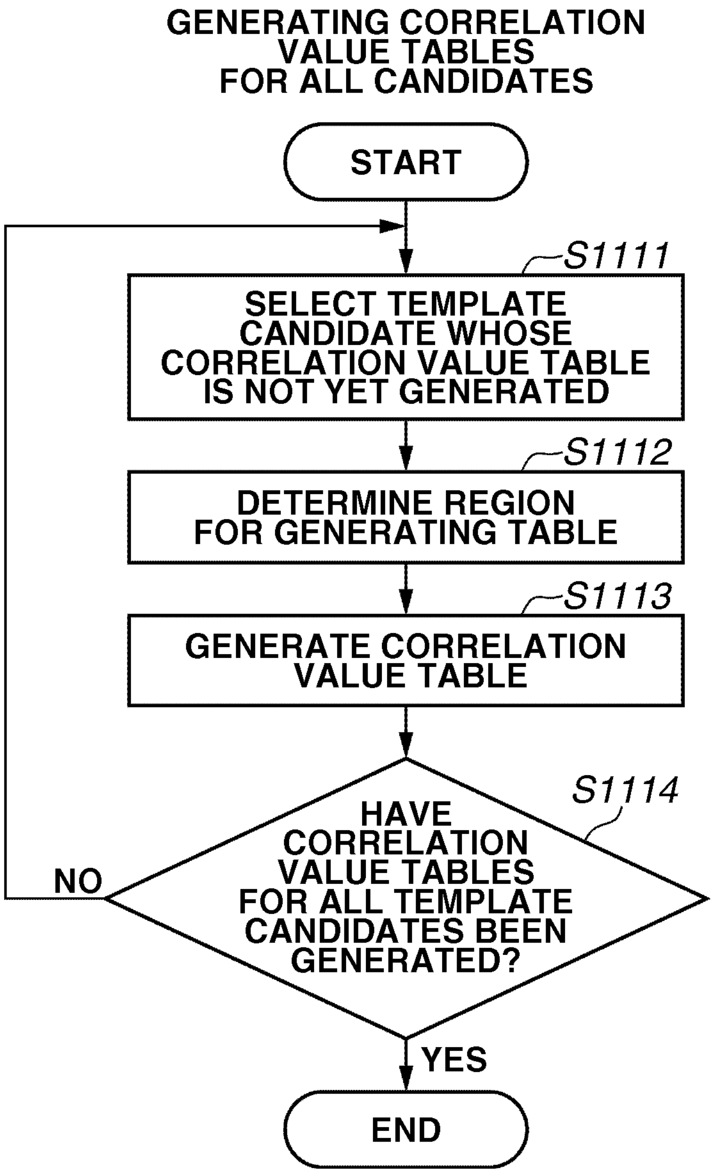

A flowchart illustrated in FIG. 11B illustrates a detailed procedure of step S1102. In step S1111, the template candidate whose correlation value table is not yet generated is selected. In step S1112, the correlation between the selected template candidate and the third image data is examined, and a limited region for generating the correlation value table is determined.

More specifically, rough values of the amounts of the movement between the first image data and the third image data are acquired from a rotation state detected by the encoder 133 included in the conveyance mechanism. A limited region where a margin is added to the rough values is set. By limiting the region in which the correlation value table is generated to the vicinity of a region that may correspond to the image of the template candidate, data having higher quality can be acquired. Additionally, by limiting the region, the number of times (amount of calculation) for examining the correlation can be decreased.

When the table evaluation value is acquired based on a tendency of the overall correlation value table, step S1112 may be omitted. In step S1113, the correlation between the image of the template candidate and the region of the third image data limited in step S1112 is examined to generate the correlation value table. Results acquired in step S1113 are stored in the RAM. In step S1114, the above-described processing is repeatedly performed by looping until the correlation value tables are generated for all template candidates.

Figure 11C:
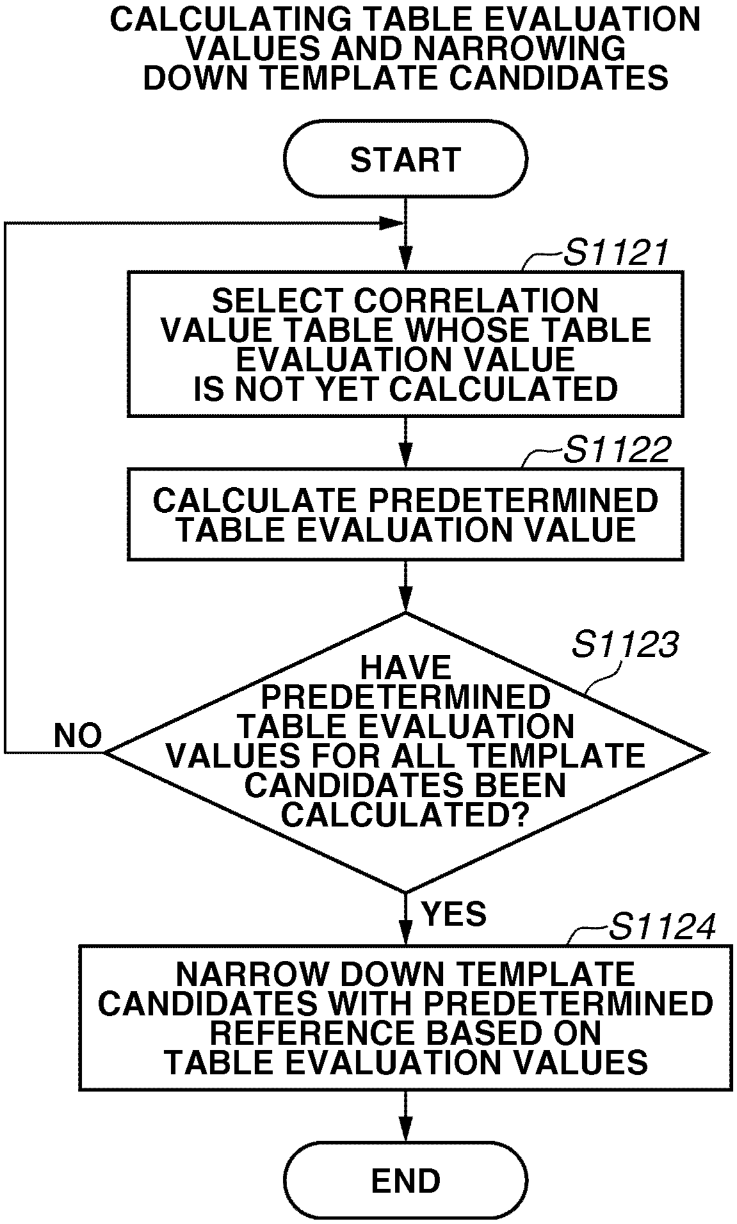
Figures 12A, 12B, 12C, 12D:
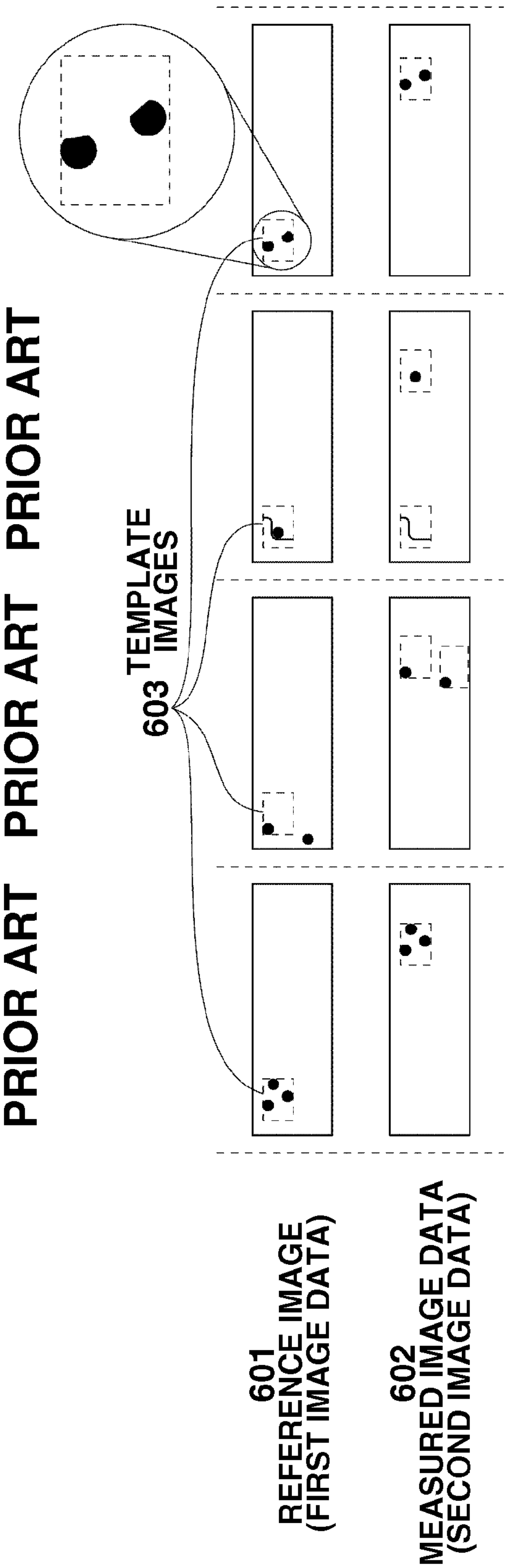
FIG.12A PRIOR ART
FIG.12B PRIOR ART
FIG.12C PRIOR ART
FIG.12D PRIOR ART
FIGS. 12A, 12B, 12C and 12D illustrate a subject of the invention.

A flowchart illustrated in FIG. 11C illustrates a detailed procedure of step S1103. In step S1121, the correlation value table whose table evaluation value is not yet calculated is selected. In step S1122, a predetermined table evaluation value is calculated for the selected correlation value table. The above-described table evaluation value is used as the table evaluation value. In step S1123, the above-described processing is repeatedly performed by looping until the table evaluation values are generated for the correlation value tables of all template candidates.

In step S1124, based on the table evaluation value calculated in step S1122, the template candidates are narrowed down using a predetermined reference. The narrowing down may be performed so that only template candidates having the table evaluation values over a predetermined threshold value are left, or, a predetermined number of table evaluation values may be selected from the top table evaluation value. For cases illustrated in FIGS. 9B and 9C, one template candidate having the highest table evaluation value is selected as the template pattern, and then the processing ends.

The narrowing down using the table evaluation value is performed by the similar algorithm to that for detecting the movement by performing the pattern matching between the first image data and the second image data. Therefore, the hardware resources can be used as it is. Further, the evaluation, which includes various types of uncertainty factors and unknown error factors that can hardly be determined by the image evaluation value, can be performed.

As described above, at least one of the first processing and the second processing is performed. The first processing analyzes the first image data and then changeably sets the position at which the template pattern is clipped. The second processing analyzes the relationships between the first image data and the third image data, and then changeably sets the position at which the template patter is clipped. By appropriately, changeably set the position at which the template pattern is clipped from the image data, the deterioration of the accuracy of the pattern matching can be decreased, thereby enabling to detect the movement of the object with stable accuracy.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-250829 filed Oct. 30, 2009, which is hereby incorporated by reference herein in its entirety.

What is claimed is:

1. An apparatus comprising:

a sensor configured to capture an image of a surface of a moving object to acquire first and second data in sequence; and a processing unit configured to acquire a movement state of the object by clipping a template pattern from the first data and seeking a region having a correlation with the template pattern in the second data, wherein the processing unit analyzes relationship between the first data and third data acquired after the first data has been acquired and before the second data is acquired, and then performs processing for setting a position at which the template pattern is clipped, wherein on the analysis, the processing unit generates a table of correlation values for respective template candidates located at a plurality of positions in the first data relative to the third data, obtains an evaluation value for each of the candidates by the table, and selects the template pattern from the candidates based on the evaluation value.

2. The apparatus according to claim 1, wherein the processing unit defines spread of the correlation values in the correlation value table or a maximum value of the correlation value as the table evaluation value.

3. The apparatus according to claim 1, further comprising:

a conveyance mechanism configured to move the object; and an encoder configured to detect a rotation state of a rotating member included in the conveyance mechanism, wherein the processing unit, when generating the correlation table, limits an area in which correlation is examined in the third data based on detection by the encoder.

4. The apparatus according to claim 1, wherein the processing unit sets a position at which the template pattern is clipped after the first data has been acquired and before the second data is acquired.

5. The apparatus according to claim 1, wherein the object is a medium or a conveyance belt that mounts and conveys the medium.

6. A recording apparatus comprising the apparatus according to claim 5 and a recording unit that performs recording on the medium.

7. A method comprising:

capturing an image of a surface of a moving object to acquire first and second data in sequence;

acquiring a movement state of the object by clipping a template pattern from the first data;

seeking a region having a correlation with the template pattern in the second data;

analyzing relationship between the first data and third data acquired after the first data has been acquired and before the second data is acquired, and then performing processing for setting a position at which the template pattern is clipped, wherein the analyzing includes generating a table of correlation values for respective template candidates located at a plurality of positions in the first data relative to the third data, calculates evaluation values for each of the candidates, and selecting the template pattern from the candidates based on the evaluation values.

8. The method according to claim 7, further comprising wherein setting a position at which the template pattern is clipped after the first data has been acquired and before the second data is acquired.

9. The method according to claim 7, wherein the object is a medium or a conveyance belt that mounts and conveys the medium.

10. The method according to claim 9, further comprising performing recording on the medium.

11. The method according to claim 7, further comprising:

moving the object by a conveyance mechanism including a driving roller;

detecting a rotation state of the driving roller; and controlling driving of the driving roller based on the detected rotation state and a movement state.

* * * * *